Dec. 27, 1960     F. S. SCHINDLER ET AL     2,965,961
METHOD OF MAKING A REINFORCED FLEXIBLE CONDUIT ASSEMBLY
Original Filed Feb. 13, 1948     2 Sheets-Sheet 2
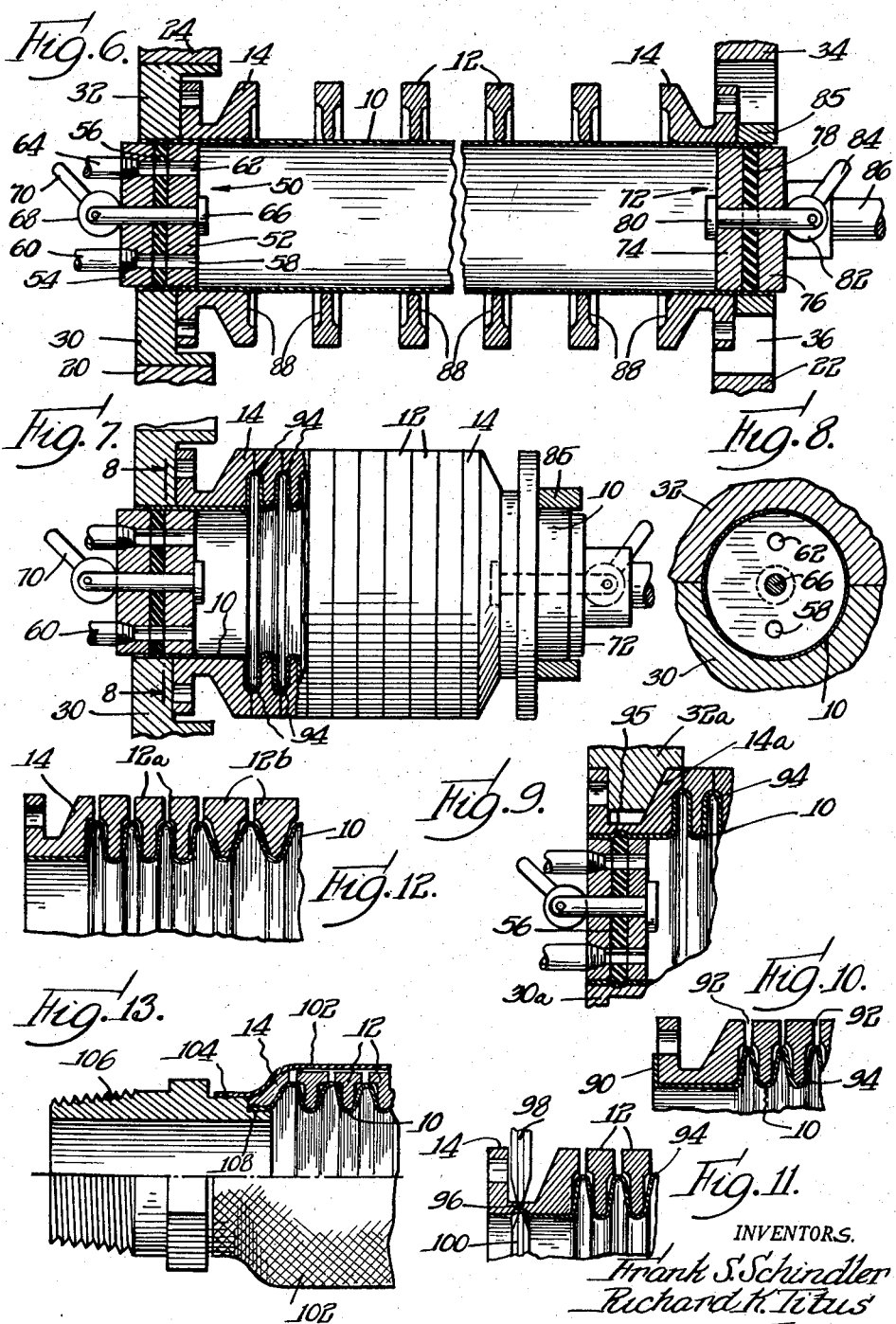
INVENTORS.
Frank S. Schindler
Richard K. Titus
By Olson & Trexler
attys.

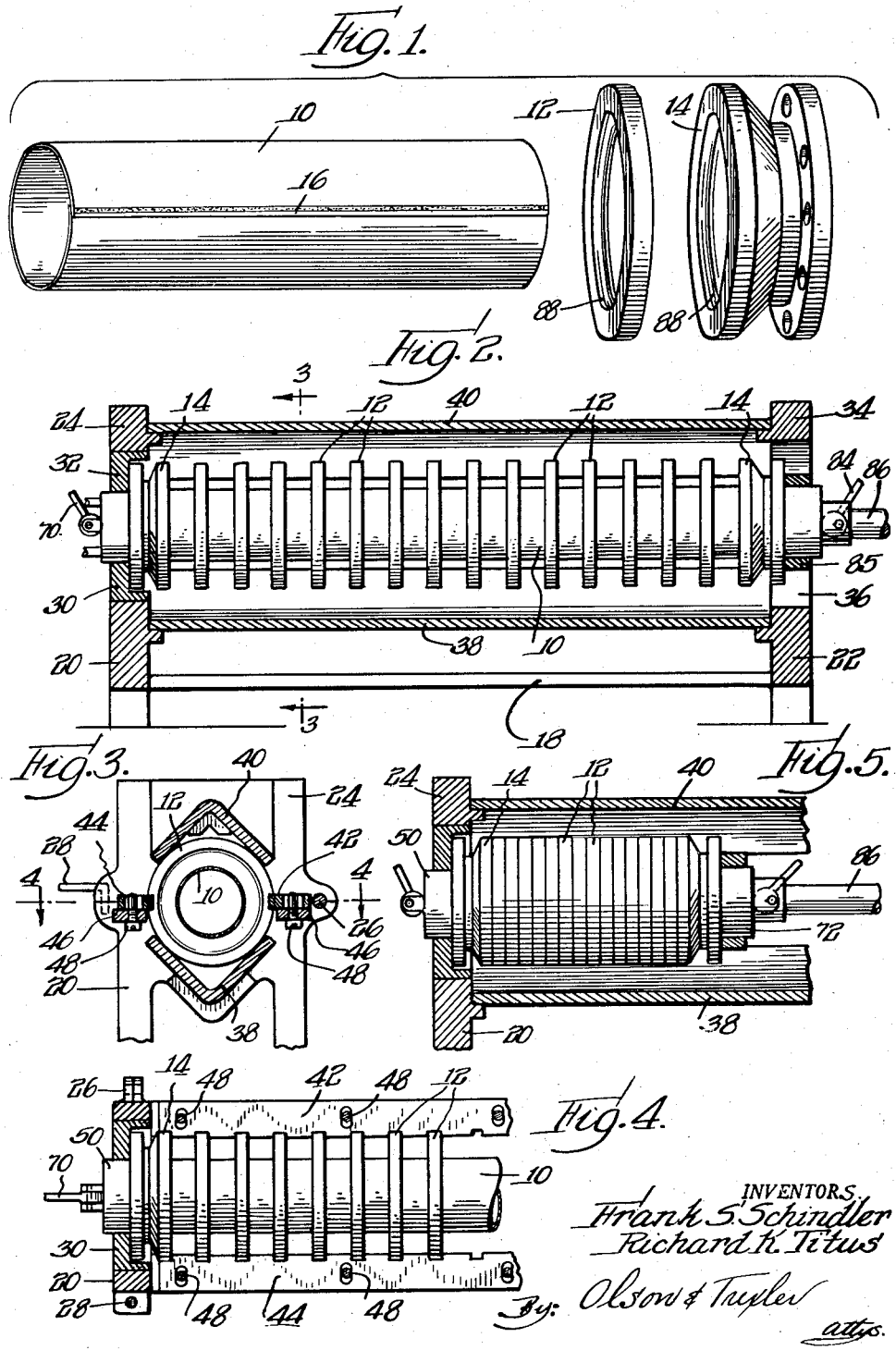

United States Patent Office 2,965,961
Patented Dec. 27, 1960

2,965,961

METHOD OF MAKING A REINFORCED FLEXIBLE CONDUIT ASSEMBLY

Frank S. Schindler, Berea, and Richard K. Titus, Akron, Ohio, assignors to Flexonics Corporation, a corporation of Illinois Original application Feb. 13, 1948, Ser. No. 8,116, now Patent No. 2,644,487, dated July 7, 1953. Divided and this application July 6, 1953, Ser. No. 366,255

3 Claims. (Cl. 29—454)

This invention relates to a method of making flexible conduit structures of the type adapted for high pressure use, and concerns particularly the reinforcement means applied to the conduit for resisting the high pressures.

In the use of flexible conduits, particularly in larger sizes such as expansion joints, use with high fluid pressures requires that reinforcing means be applied to the conduit structure for enabling the flexible member or structure to resist the high pressure forces involved. In certain instances such reinforcing means takes the form of rings which are disposed in embracing relation to the convolutions of the flexible member so as to control the operation of the member and aid in the resisting of internal bursting fluid pressures. In expansion joints, for example, the flexible member may comprise a thin wall annularly corrugated flexible conduit piece, the annular corrugations being embraced respectively by a series of annular rings suitably shaped to conform to the convolution contours.

In the conventional fabrication of such units the flexible conduit piece or member is first formed by suitable means, such for example as drawing, or forming and welding a cylindrical blank from sheet stock, followed by the corrugating operations, such for example as rolling or other forming operations; after which the reinforcing rings are applied as complemental half circular pieces suitably bolted together in embracing relation to the formed convolutions. Such fabrication of the unit is costly, and is moreover subject to certain difficulties such for example as the weakening of the reinforcement rings by the bolt holes, the unbalance of the bolt connections, and other unsatisfactory conditions induced by the nature and method of assembly of the parts.

In accordance with the present invention the reinforcement rings, heretofore mentioned, are employed as a part of the apparatus or means by which the corrugating of the flexible member is effected, whereby to secure economy of fabrication and improved operating characteristics in a number of important particulars, as will hereinafter be pointed out.

Accordingly it is an object of the present invention to provide a reinforced flexible conduit structure, of the foregoing type, of improved construction and improved operating characteristics.

It is a further object of the invention to provide improved methods and apparatus for effecting the production of reinforced flexible conduits of the type defined.

More specifically stated, it is an object of the present invention to provide an improved reinforced flexible conduit, and methods and apparatus for fabrication, wherein the unit may be more cheaply fabricated; wherein the reinforcement means will have greater strength and balance in respect to its size and weight; and wherein a better fit and cooperation is obtained between the reinforcing means and the convolutions of the flexible member providing increased durability, a greater latitude in manufacturing tolerances, and smoothness of operation.

A still further object of the invention is to provide an improved reinforced flexible conduit in avoidance of the difficulties heretofore discussed.

Various other objects, advantages and features of the invention will be apparent from the following specification when taken in connection with the accompanying drawings, wherein certain preferred embodiments are set forth for purposes of illustration.

In the drawings, wherein like reference numerals refer to like parts throughout:

Fig. 1 is an exploded perspective view of certain of the parts employed in the fabrication of the reinforced flexible conduit, in accordance with the principles of the present invention, to provide an expansion joint or structure;

Fig. 2 is a partial illustrative side view of the apparatus employed in manufacturing the structure of the invention, the parts being illustrated in one of the initial steps of fabrication;

Fig. 3 is a transverse sectional view of the structure of Fig. 2 on the line 3—3 thereof;

Fig. 4 is a horizontal sectional view of the structure of Figs. 2 and 3, on the line 4—4 of Fig. 3;

Fig. 5 is a view similar to Fig. 2, showing the parts in a later step of fabrication;

Fig. 6 is a longitudinal sectional view of the parts of Fig. 2, on an enlarged scale, and more particularly showing the details of construction;

Fig. 7 is a view similar to Fig. 6 showing a subsequent step in the fabricating operations;

Fig. 8 is a transverse sectional view of the structure of Fig. 7 on the line 8—8 thereof;

Fig. 9 is a partial view, similar to the showings in Fig. 6, but illustrating a modified form of construction;

Figs. 10 and 11 are detail illustrative views showing the end detail of the unit as fabricated respectively by the methods of Figs. 6 and 9;

Fig. 12 is a view illustrating a modified form of reinforcement ring; and

Fig. 13 is a view showing the principles of the invention as applied to flexible tubing.

Referring more specifically to the drawings, and first to the embodiment of Figs. 1–7, in Fig. 1 there is illustrated a cylindrical conduit piece or member 10, a reinforcement ring 12, and a reinforcement ring 14, the parts being shown in juxtaposed position prior to assembly.

The conduit piece 10 is preferably of suitable metal, plastic or other material having the desired physical properties for the installation to be made, and may be drawn, or fabricated from flat sheet stock bent into cylindrical shape and, in the case of metal, longitudinally seam welded as indicated at 16.

Referring to Figs. 2, 3 and 4, a forming apparatus is shown comprising a machine base 18 having frame pedestals 20 and 22 disposed at the opposite ends thereof. The pedestal 20 comprises a lower stationary portion and a hinged upper portion 24 pivotally mounted upon the lower portion as indicated at 26, Fig. 3; there being a clamping control handle as indicated at 28 for locking and unlocking the upper hinged portion 24 for pivotal movement. Split die or clamping members as indicated at 30 and 32 are carried, respectively, by the lower and upper pedestal members, said clamping dies being removably secured to the pedestals and being of a size and shape in conformance with the particular conduit structure to be formed.

The pedestal 22 is provided with an upper hinged portion as indicated at 34, similar hinged connections and control being provided as in the case of the parts 26 and 28 previously described. The cooperative pedestal portions 22, 34, however, instead of carrying split die members 30 and 32, are cut away to provide an enlarged central opening 36 for a purpose as will presently appear.

A V-shaped guide and support member 38 extends between and is supported by the fixed pedestals 20, 22, whereas a similarly shaped guide member 40 extends between and is supported by the hinged pedestal members 24 and 34.

As shown in Figs. 3 and 4, the fixed pedestals also provide support for a pair of spacing or templet bars 42 and 44 provided at opposite sides of the pedestal structures. More specifically, the templet bars are carried by a pair of longitudinal frame supports 46, there being pins or bolts 48 upstanding from such supports having slotted interconnection with the templet bars so that the templets may be shifted laterally toward and away from each other.

Referring to Fig. 6, it will be seen that there is provided a clamping plug 50 adapted to be positioned between the cooperative split dies 30 and 32. More specifically, the plug member comprises a pair of plates 52 and 54 secured together and having interposed therebetween a plate or sheet of rubber 56. The plug is provided with a passage 58 interconnecting with a liquid supply conduit 60 leading from a suitable pressure reservoir, and a passage 62 interconnecting with an air escape or exhaust conduit 64. A bolt 66 extends through the plug, the bolt having pivoted to its outer end a cam 68 to which is secured a handle 70. Arrangement is such that upon manipulation of the handle, the plates 52 and 54 may be compressed relatively toward each other so as to radially expand the rubber member 56 into clamping engagement toward the split die members 30 and 32.

Referring further to Fig. 6, it will be seen that the apparatus further comprises a second plug member generally indicated by the reference numeral 72, composed of a pair of metal plates 74 and 76 adapted to clampingly engage an intermediate plate 78 of rubber or the like. A bolt 80 operable by a cam 82 and handle 84 is provided for effecting the radial expansion of the rubber plate 78, as in the case of the plug structure 50 previously described. The rubber plate 78 cooperates with a ring 85 adapted to be arranged in embracing relation therewith. The plug 72 is carried by the end of a piston rod 86 adapted to be connected to a suitable cylinder and piston structure (not shown) by which the piston rod may be power propelled in an axial direction.

In the operation of fabricating the reinforced flexible conduit, in accordance with the present invention, the cylinder blank 10 is mounted within the forming apparatus, as shown in Fig. 2, with the reinforcement rings 12 embracing the blank in predetermined spaced relation, as shown. In addition to the intermediate rings 12, the number of which is determined by the length and desired physical characteristics of the completed unit, one end flange reinforcing ring 14 is arranged at either end of the structure.

In mounting the cylinder blank 10 and the reinforcement rings 12 and 14 into position, the hinged pedestal sections 24 and 34 are raised so as to render the interior of the forming apparatus accessible. The lower support trough 38 is so disposed as to properly position the parts, the rings 12 and 14 being supported thereon.

To effect the rapid and proper axial placement of the rings, the templet bars 42 and 44 are brought into operative position, as shown in Fig. 4. The inner edges of these bars are notched at proper intervals to space and position the reinforcement rings.

The plug members 50 and 72 are next mounted in position, into the opposite ends of the cylinder blank, the ring 85 being arranged in embracing relation to one end of the tube, around the plug 72.

The hinged pedestal sections 24 and 34 may next be lowered, and clamped; and the handles 70 and 84 manipulated to grip the opposite ends of the cylindrical blank. As will be understood, one end of the blank is clamped in a fluid-tight joint between the rubber plate 56 and the cooperative die members 30 and 32. The opposite end of the blank is gripped in a fluid-tight connection between the rubber expander plate 78 and the ring 85.

The templet bars 42 and 44 are next withdrawn, after which liquid under pressure is introduced into the interior of the cylindrical blank 10 by means of the pressure conduit 60 and associated plug passage 58. Trapped air within the blank is relieved through passage 62 and associated conduit 64, as will be understood. As the hydraulic pressure is introduced, axial force is also imparted to the piston rod 86, whereby to effect a radial expansion and axial collapse of the wall sections of the blank 10 at spaced intervals, so as to form annular corrugations therein. The parts are shown prior to the forming operation in Figs. 2 and 6, and after the forming in Figs. 5 and 7. During the forming operation the reinforcing rings 12 move into engagement, as shown in Fig. 7, the guide members 38 and 40 being sufficiently spaced when the pedestals are clamped to permit free axial movement of the rings.

As best shown in Figs. 6 and 7, the interior surfaces of the rings 12 and 14 are shaped as indicated at 88 so as to impart a predetermined shaping to the convolution walls as the convolutions are formed.

Upon relief of the hydraulic pressure, withdrawal of the plugs, and opening of the pedestal hinge sections, the assembled expansion unit comprised of the corrugated blank 10 and the integral rings 12 and 14 may be removed from the forming apparatus. To complete the unit each end of the blank 10 may be flanged over onto the end face of its associated flange member 14, as indicated at 90 in Fig. 10. Also, a slight axial pulling force is imparted to each end of the blank so as to effect a slight separation of the rings as shown at 92.

It will be seen that in accordance with the structures set forth, the reinforcing rings 12 and 14, which remain as a part of the completed unit, are employed also as the forming dies for forming the convolutions in the cylindrical blank or flexible conduit piece 10. The production of a reinforced flexible conduit, such for example as an expansion unit, it thus facilitated inasmuch as it is not necessary to assemble reinforcing rings upon the structure after the corrugating operations. Further, the various reinforcement rings 12 and 14 are of one piece integral construction, the unbalance and weakness of bolt holes and associated bolt connections being avoided. The rings may thus be made smaller, and lighter in weight, in respect to any required ring strength. Still further, any slight irregularities or imperfections as may be present in the rings will be reproduced in the associated convolutions 94 of the member 10 cooperable therewith, so that such irregularities and imperfections in effect neutralize themselves and in any event cannot become cumulative as may result in instances wherein the convolutions and the rings are separately formed. A prefect fit between the convolutions 94 and their associated reinforcing rings is thus insured; while at the same time expensive machining of the rings is not required.

The flanging operation for the end of the flexible cylindrical member may be avoided by means as illustrated in Fig. 9. In this instance the end flange reinforcing ring as indicated at 14a, corresponding in function and purpose to the reinforcing ring 14 previously described, is employed as the reaction base for the rubber clamping plate 56, the split die members, such for example as indicated at 32a, being shaped to receive the ring 14a and to conform thereto. The ring 14a is preferably in this instance provided with a recess 95 into which an annular portion of the member 10 is projected as the rubber plate 56 is expanded.

If desired, the interconnection between the members 10 and 14a may be further reinforced by a circular seam resistance weld, as indicated at 96 in Fig. 11, the weld being formed after the corrugating operation by suitable means such as welding rollers 98 and 100.

The present invention particularly lends itself to constructions wherein, due to the requirements of a particular installation, the reinforcing rings may be of different cross section so as to impart predetermined characteristics of movement to the flexible conduit piece. Thus in Fig. 12 an embodiment is illustrated wherein the intermediate reinforcing rings as indicated respectively at 12a and 12b are of different cross sectional contour, and resultingly the corrugations in the flexible member 10 will be differently shaped in conformity thereto. As in the previously described structures, it will be seen that the convolutions of the flexible conduit piece will be automatically shaped to conform to the contours of the reinforcing rings, simultaneously as the rings are non-removably secured upon the flexible member.

In the structures heretofore described, the reinforced flexible conduit of the invention has been illustrated primarily as embodied into an expansion joint for conduits and the like. In Fig. 13 a flexible hose or tubing is illustrated embodying the invention. The flexible conduit member 10 in this instance forms a flexible tube or hose, upon which there is assembled the plurality of reinforcing rings as indicated at 12 and 14. Due to the fact that the rings are integral, and unimpeded by bolts and the like, it will be seen that they may be readily encompassed within a braid 102, the end of which is circular seam resistance welded as indicated at 104 to a suitable coupling piece 106. The tubing end and the ring 14 may also be circular seam resistance welded to the coupling as indicated at 108, in a manner similar to the formation of the weld 96 previously described. As will be understood, the weld 108 is formed prior to the application of the braid. The rings 12 and 14 may be made of aluminium or magnesium, whereby to provide a lightweight hose structure. The rings not only impart strength to the tube member 10, resistant to fluid internal pressures, but also act as limiting means for limiting the degree of bending imparted to any convolution of the tubing whereby to preclude inadvertent rupture or the like. The braid provides resistance to axial elongation due to fluid pressure. Still further, the rings and braid provide protection for the convolutions of the tubing against inadvertent hammer knocks and the like. As in the embodiments previously described, the rings 12 and 14 are employed as dies for forming the tubing convolutions, the dies being non-removably connected to the tubing as an incident to the convolution forming operations. The structure of Fig. 13 thus provides a rugged high pressure hose unit which may be readily fabricated by means of the rings 12 and 14 which provide the dual purposes of reinforcing rings and forming dies.

It is obvious that various changes may be made in the specific embodiments set forth without departing from the spirit of the invention. The invention is accordingly not to be limited to the specific embodiments shown and described, but only as indicated in the following claims.

The invention is hereby claimed as follows:

1. A method of making a reinforced flexible conduit assembly of a corrugated tube and reinforcing members comprising arranging a plurality of one piece ring-like reinforcing members along a straight substantially smooth walled tube to be corrugated, spacing said reinforcing members from each other a distance at least substantially twice as great as the height of the corrugations to be formed and locating opposite endmost reinforcing members adjacent opposite ends of the tube, sealing opposite ends of the tube, introducing hydraulic liquid into the tube and simultaneously bleeding any air within the tube from the tube while the tube is being filled with liquid, then applying hydraulic pressure to the liquid within the tube and simultaneously applying an axial compression force to opposite ends of the tube and thereby forming annular corrugations in the tube of substantially greater radial extent than axial extent in the vicinity of their junctions with the remainder of the tube and thereby retaining intermediate reinforcing rings on the tube, and securing said endmost reinforcing members to said end portions of the tube.

2. A method, as defined in claim 1, wherein said step of securing said endmost reinforcing members to said end portions of the tube comprises annularly resistance welding said endmost reinforcing members to said end portions of the tube.

3. A method of making a reinforced flexible conduit assembly of a corrugated tube and reinforcing members comprising arranging a plurality of one piece ring-like reinforcing members along a straight substantially smooth walled tube to be corrugated, spacing said reinforcing members from each other a distance at least substantially twice as great as the height of the corrugations to be formed and locating opposite endmost reinforcing members adjacent opposite ends of the tube, sealing opposite ends of the tube, then applying internal hydraulic pressure to the tube and simultaneously applying an axial compressive force to an opposite end of the tube and thereby expanding the tube between said reinforcing members and molding the tube against complementary surfaces of said reinforcing members and thereby forming annular corrugations in said tube of greater radial than axial extent and conforming to said complementary surfaces, and thereby retaining said reinforcing members on the tube in permanent association therewith.

References Cited in the file of this patent

UNITED STATES PATENTS

| | | |
|---|---|---|
| 349,718 | Hollerith et al. | Sept. 28, 1886 |
| 1,689,620 | Clifford | Oct. 30, 1928 |
| 1,733,455 | Ferrand | Oct. 29, 1929 |
| 1,835,314 | Lord | Dec. 8, 1931 |
| 1,946,472 | Babcock | Feb. 13, 1934 |
| 1,980,264 | Giesler | Nov. 13, 1934 |
| 2,048,588 | Babcock | July 21, 1936 |
| 2,106,496 | Debor | Jan. 25, 1938 |
| 2,115,419 | Dreyer | Apr. 26, 1938 |
| 2,323,985 | Fausek | July 13, 1943 |
| 2,345,207 | Mansfield | Mar. 28, 1944 |
| 2,365,181 | Fentress | Dec. 19, 1944 |
| 2,444,988 | Guarnaschelli | July 13, 1948 |
| 2,541,869 | Grant | Feb. 13, 1951 |
| 2,565,184 | Parlasca | Aug. 21, 1951 |
| 2,610,667 | Puster | Sept. 16, 1952 |
| 2,623,570 | Resser | Dec. 30, 1952 |
| 2,631,640 | Zallea | Mar. 17, 1953 |
| 2,635,330 | Fentress | Apr. 21, 1953 |

FOREIGN PATENTS

| | | |
|---|---|---|
| 684,910 | France | Mar. 24, 1930 |

OTHER REFERENCES

The disclosure in Fig. E on Page 5 of the pamphlet "Rex-Flex," published by the Chicago Metal Hose Corp., received by the U.S. Patent Office on December 23, 1940.